(12) United States Patent
Heyman et al.

(10) Patent No.: US 8,776,058 B2
(45) Date of Patent: Jul. 8, 2014

(54) DYNAMIC GENERATION OF VM INSTANCE AT TIME OF INVOCATION

(75) Inventors: Jerrold M. Heyman, Raleigh, NC (US); Michael L. Nelson, Raleigh, NC (US); Andrew G. Tonkin, Morrisville, NC (US); Kent R. Milligan, Rochester, MN (US); Antonio N. Pirraglia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/316,524

(22) Filed: Dec. 11, 2011

(65) Prior Publication Data

US 2013/0152079 A1 Jun. 13, 2013

(51) Int. Cl.
*G06F 9/455* (2006.01)

(52) U.S. Cl.
USPC ............................................................ 718/1

(58) Field of Classification Search
USPC ................................................. 718/104, 107
See application file for complete search history.

(56) References Cited

U.S. PATENT DOCUMENTS

| | | | | |
|---|---|---|---|---|
| 5,771,381 | A * | 6/1998 | Jones et al. | 713/100 |
| 6,044,465 | A * | 3/2000 | Dutcher et al. | 726/13 |
| 7,451,443 | B2 | 11/2008 | Lowell et al. | |
| 7,496,613 | B2 | 2/2009 | Raghunath | |
| 8,359,594 | B1 * | 1/2013 | Davidson et al. | 718/1 |
| 2007/0271561 | A1 | 11/2007 | Winner et al. | |
| 2008/0313626 | A1 | 12/2008 | Kodaka et al. | |
| 2009/0007105 | A1 | 1/2009 | Fries et al. | |
| 2009/0222496 | A1 * | 9/2009 | Liu et al. | 707/204 |
| 2010/0114825 | A1 | 5/2010 | Siddegowda | |
| 2010/0229185 | A1 | 9/2010 | Howarth | |
| 2010/0287544 | A1 | 11/2010 | Bradfield et al. | |
| 2011/0071983 | A1 * | 3/2011 | Murase | 707/649 |
| 2011/0083122 | A1 * | 4/2011 | Chen et al. | 717/124 |
| 2011/0126186 | A1 | 5/2011 | Srinivasan | |
| 2011/0167473 | A1 | 7/2011 | Evans et al. | |

OTHER PUBLICATIONS

Zhou et al.; "Always Up-To-Date—Scalable Offline Patching of VM Images in a Compute Cloud", ACSAC ACM, Austin, Texas, Dec. 6-10, 2010, pp. 1-10.
Umeno et al.; "Performance Evaluation on Server Consolidation Using Virtual Machines", SICE-ICASE International Joint Conference, Oct. 18-21, 2006, pp. 2730-2734.
Kourai et al.; "A Fast Rejuvenation Technique for Server Consolidation with Virtual Machines", DSN 37Annual IEEE/IFIP Inter. Conf. on Jun. 25-28, 2007, pp. 245-254.
IP.com et al.; "Method and System to Consolidate the Image-Based Server Provisioning Through a Common Image Metamodel", IPCOM000207872D, Jun. 14, 2011.

* cited by examiner

*Primary Examiner* — Van Nguyen
(74) *Attorney, Agent, or Firm* — Steven L. Bennett

(57) ABSTRACT

Responsive to a request to invoke a given virtual machine (VM) instance, a base VM instance corresponding to a number of VM instances, including the given VM instance, is retrieved. A VM change file particular to just the given VM instance is also retrieved. The VM change file indicates how the given VM instance varies from the base VM instance. The VM change file is applied to the base VM instance to dynamically generate the given VM instance, and the given VM instance is then invoked. Responsive to a request to subsequently shutdown the given VM instance, the VM change file is updated to reflect how the given VM instance varies from the base VM instance. The given VM instance is then shutdown and deleted.

14 Claims, 4 Drawing Sheets

DYNAMIC GENERATION OF VM INSTANCE AT TIME OF INVOCATION

BACKGROUND

A computing device typically runs one instance of an operating system that has access to the hardware resources of the computing device. However, a technique known as virtualization permits a number of instances of operating systems to run on a computing device. In virtualization, a number of such virtual machines (VMs) are instantiated, and each VM runs its own instance of an operating system.

SUMMARY

A method of an embodiment of the disclosure includes, in response to a request to invoke a given virtual machine (VM) instance for a given user, retrieving a base VM instance corresponding to a number of VM instances for a number of users, including the given VM instance for the given user. The method includes retrieving a VM change file particular to just the given VM instance. The VM change file indicates how the given VM instance varies from the base VM instance for the given user. The method includes applying the VM change file to the base VM instance to dynamically generate the given VM instance. The method includes invoking the given VM instance as has been dynamically generated.

A system of an embodiment of the disclosure includes a storage device to store a base VM instance corresponding to a number of VM instances, and to store a number of VM change files corresponding to the VM instances. Each VM change file indicates how just the VM instance to which the VM change file corresponds varies from the base VM instance. The system includes a VM manager to, responsive to a request to invoke a selected VM instance of the VM instances, apply the VM change file corresponding to the selected VM instance to the base VM instance to dynamically generate the selected VM instance and invoke the selected VM instance that has been dynamically generated.

A computer program product of an embodiment of the disclosure includes a computer-readable storage medium having computer-readable code embodied therein. The computer-readable code is executable by a processor to, responsive to a request to shutdown a particular VM instance that has been invoked and is running, generate a VM change file. The VM change file corresponds to just the particular VM instance, and is generated to reflect how the particular VM instance varies from a base VM instance corresponding to a number of VM instances including the particular VM instance. The computer-readable code is further to shut down the particular VM instance, and then delete the particular VM instance.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
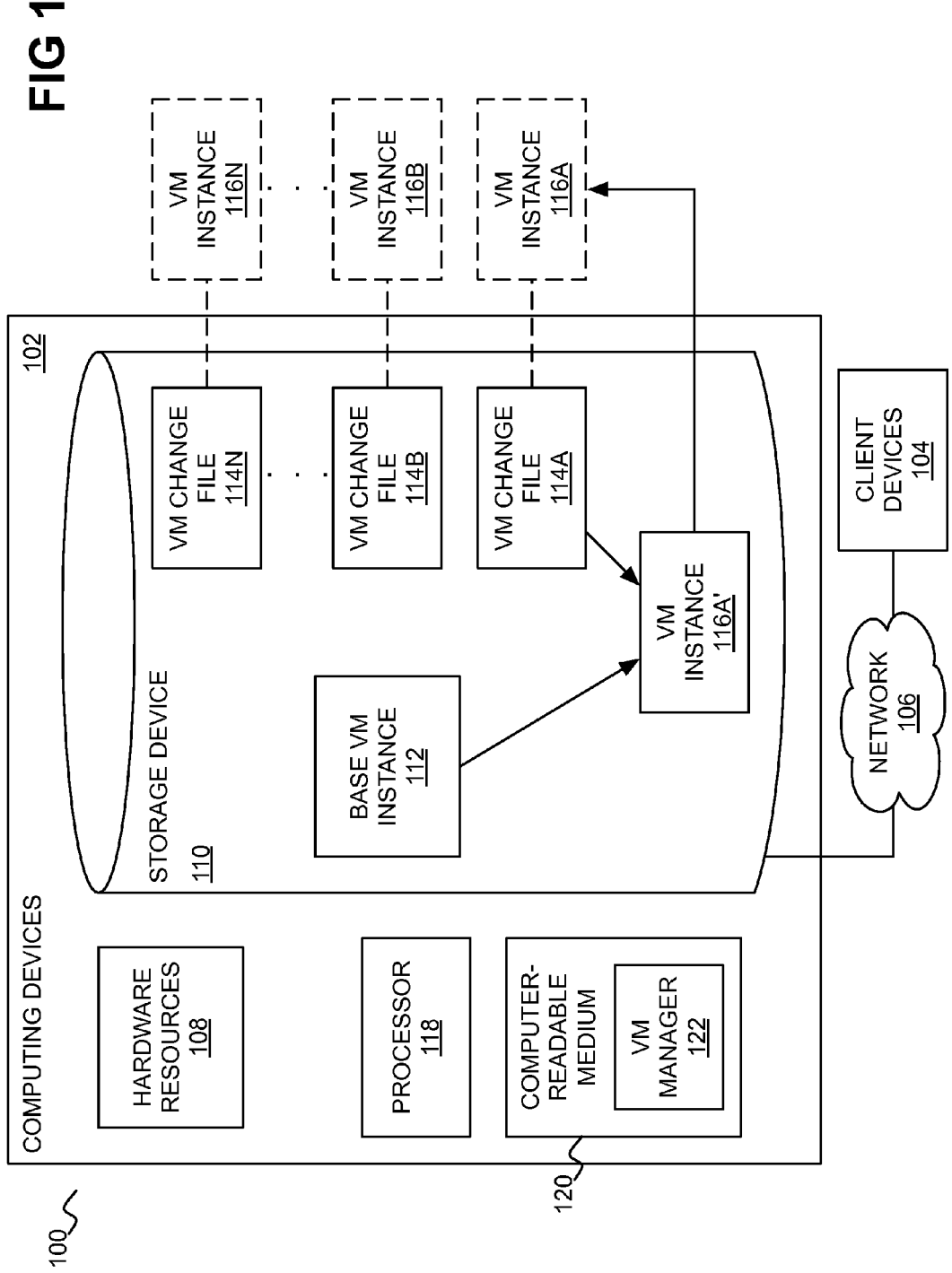
FIG. 1 is a diagram of a system in which virtual machine (VM) instances are dynamically generated at time of invocation, according to an embodiment of the disclosure.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, virtual machines (VMs) permit multiple operating system instances to be run on the same hardware of a computing device, in accordance with a technique known as virtualization. An entity like a corporation may deploy thousands of VMs, if not more, each of which may be used by a different user. As compared to more traditional topologies in which each user has his or her own dedicated computing resources, such as his or her own dedicated computing device, VMs provide certain advantages.

First, VMs permit more efficient utilization of an entity's computing resources. When each user has his or her own dedicated computing device, most of the time the computing device sits idle, waiting for further input or commands from its user. By comparison, with virtualization, a number of VMs share the same computing resources. As such, when one VM is currently idle and awaiting input or commands, another VM may not be. This means that a lesser amount of computing resources is typically needed to serve the same number of users when VMs are utilized, as compared to where each user has his or her own dedicated computing device.

Second, VMs permit more centralized management of computing resources. When each user has his or her own dedicated computing device, an administrator may have to travel to the location of each user to perform maintenance on the user's computing device. By comparison, with virtualization, a number of VMs share the same computing resources, which may be centrally located near the administrators. As such, to perform maintenance, an administrator does not have to travel to the location of each user, which provides for easier performed maintenance.

However, virtualization does not overcome other drawbacks of each user having his or her own dedicated computing device. First, when a user has his or her own dedicated computing device, the computing device includes a storage device that stores the operating system, application programs, and other files that permit the computing device to be used in a desired manner. Virtualization does permit this information for each user to be stored on a central storage device or devices, but does not alleviate the space required for each user. That is, even when using VMs, each VM requires a certain amount of storage space to store its operating system, application programs, and other files, no different than with a dedicated computing device.

Second, when a user has his or her own dedicated computing device, if the operating system, application programs, and other files that permit the computing device to be used in a desired manner have to be updated, the information of each user has to be updated individually. Virtualization does not alleviate such individual updating. Even when using VMs, the operating system, application programs, and other files of each VM have to be updated individually, no differently than with dedicated computing devices. While management tools are available to roll out updates to a number of computing devices—and thus to a number of VMs as well—in a more automated fashion, ultimately the updates are performed at each VM separately, no differently than if dedicated computing devices were used in lieu of VMs.

Disclosed herein are techniques to overcome these drawbacks that existing virtualization techniques still have. Individual VMs are referred to herein as individual VM instances. There is a base VM instance that corresponds to a number of VM instances for a number of users. For instance, the users of an entity may all be running the same version of the same operating system, as well as a common set of application programs. The base VM instance includes this baseline configuration, and is the only VM instance that is completely persistently stored.

By comparison, the VM instances themselves to which the base VM instance corresponds are stored as VM change files. Each VM change file corresponds to a particular VM instance, and indicates how a particular VM instance varies from the base VM instance for a corresponding user. The VM change files are typically much smaller in size than a complete VM, and therefore the VM instances effectively require significantly less storage space by being stored as a common single base VM instance plus a number of VM change files, as compared to being stored as a number of complete VM instances as is conventional.

Furthermore, updating the VM instances does not require each VM instance to have to be individually updated when the disclosed techniques are employed. Rather, in many cases, just the base VM instance has to be updated. Because each VM instance is represented as the base VM instance plus a corresponding VM change file, updating the base VM instance effectuates updating of all the VM instances en masse. For example, if the VM instances are being migrated to a new service pack of an operating system, updating the base VM instance to reflect this new service pack effectively results in updating all the VM instances en masse, without having to individually update each VM instance as is conventional.

FIG. 1 shows a system 100, according to an embodiment of the disclosure. The system 100 includes one or more computing devices 102 and one or more client devices 104 that are communicatively interconnected with one another over a network 106. However, in another implementation, the computing devices 102 may be directly connected to the client devices 104, such as using a keyboard-video-mouse (KVM) or other arrangement.

The computing devices 102 may be server computing devices, for instance, and include hardware resources 108 and a storage device 110. The hardware resources 108 include resources like processors, memory devices, and other hardware resources. The storage device 110 is internal to the computing devices 102 in the implementation of FIG. 1, but in another implementation, may be external to the computing devices 102. The storage device 110 may include one or more hard disk drives, one or more solid state devices (SSDs), one or more storage-area networks (SANs), and/or other types of storage devices.

The storage device 110 stores a base VM instance 112, and a number of VM change files 114A, 114B, . . . , 114N, which are collectively referred to as the VM change files 114. The VM change files 114 correspond to VM instances 116A, 116B, . . . , 116N, which are collectively referred to as the VM instances 116. The VM instances 116 virtualize the hardware resources 108 of the computing devices 102 as VMs, so that users of the client devices 104 use the VMs as if they were physical computing devices. The client devices 104 themselves may be desktop or laptop computers, tablet devices, smartphone devices, and other types of client computing devices.

The base VM instance 112 can include a complete working and configured instance of an operating system, as well as application programs that are used by all the VM instances 116. By comparison, each VM change file 114 can each include the application programs that are particular to the VM instance 116 and that are not used by all the VM instances 116. Each VM change file 114 can further include other data that is relevant to the VM instance 116 and not to all the VM instances 116.

Each VM instance 116 may be for a different user, who may use the corresponding VM via one of the client devices 104. When the VM instances 116 are not being used, they do not occupy any storage space on the storage device 110 beyond their corresponding VM change files 114 and the base VM instance 112 that is shared by all the VM instances 116. Stated another way, the VM instances 116 are persistently stored on the storage device 110 only insofar as their corresponding VM change files 114 and the common base VM instance 112 are stored on the storage device 110. A complete version of any given VM instance 116 is not otherwise persistently stored on the storage device 110.

For instance, consider an example in which a user on a client device 104 wishes to invoke and thus use the VM instance 116A. A copy of the base VM instance 112 is copied on the storage device 110, and the corresponding VM change file 114A is applied to this copy of the base VM instance 112, to dynamically generate a temporary working version of the VM instance 116A on the storage device 110, which is referred to as the VM instance 116A' in FIG. 1. Unless and until the VM instance 116A is invoked, however, no such separate and complete copy of the VM instance 116A' is stored on the storage device 110.

Next, consider an example in which the user is finished using the VM instance 116A. The VM instance 116A' is compared to the base VM instance 112, and optionally to the VM change file 114A, so that the VM change file 114A can be updated or generated. The VM instance 116A' can then be shutdown and deleted. As such, when the user is no longer using the VM instance 116A, the separate and complete copy of the VM instance 116A' is deleted and is not persistently stored on the storage device 110. Rather, just the VM change file 114A that corresponds to the VM instance 116A is, but which does not completely represent the VM instance 116A, since the VM instance 116A is in actuality a combination of the base VM instance 112 and the VM change file 114A.

The VM instances 116 are thus depicted in dotted-line boxes in FIG. 1 to indicate that they are not in actual complete and individual existence when not running. Rather, the VM instances 116 are said to exist when not running insofar as their corresponding VM change files 114 are stored on the storage device 110. However, the VM change files 114 themselves are not complete copies of the VM instances 116, but rather represent how the VM instances 116 vary from the common and single base VM instance 112.

As a result of the foregoing, the storage requirements for the VM instances 116 on the storage device 110 are reduced. In all likelihood, the base VM instance 112 requires more storage space than any VM change file 114. Therefore, in lieu of persistently storing complete copies of the VM instances 116 on the storage device 110, as is conventional, storing a base VM instance 112 that is common to each VM instance 116, and storing a VM change file 114 that indicates how a corresponding VM instance 116 varies or differs from the base VM instance 112, is more efficient.

Furthermore, updating of the VM instances 116 is more easily achieved. Rather than having to update persistently stored complete copies of the VM instances 116 individually, just the base VM instance 112 typically has to be updated. Because each VM instance 116 is realized at runtime by applying a corresponding VM change file 114 to the base VM instance 112, updating the base VM instance 112 effectively updates all the VM instances 112, without having to individually update each VM instance 116.

The computing devices 102 also include a processor 118 and a computer-readable medium 120. The processor 118 may or may not be one of the processors of the hardware resources 108 that are virtualized via the VM instances 116, and the computer-readable medium 120 may or may not be the storage device 110. The computer-readable medium 120 stores a VM manager 122, which can be implemented as a computer program that is executed by the processor 118.

The VM manager 122 performs the functionality that has been described above as to invoking and/or shutting down the VM instances 116. The VM manager 122 additionally or alternatively performs the functionality that has been described above as to updating the base VM instance 112 to effectively update all the VM instances 116. In these respects, the VM manager 122 can perform the methods 200, 300, and 400 of FIGS. 2, 3, and 4, which are now described.

Figure 2:
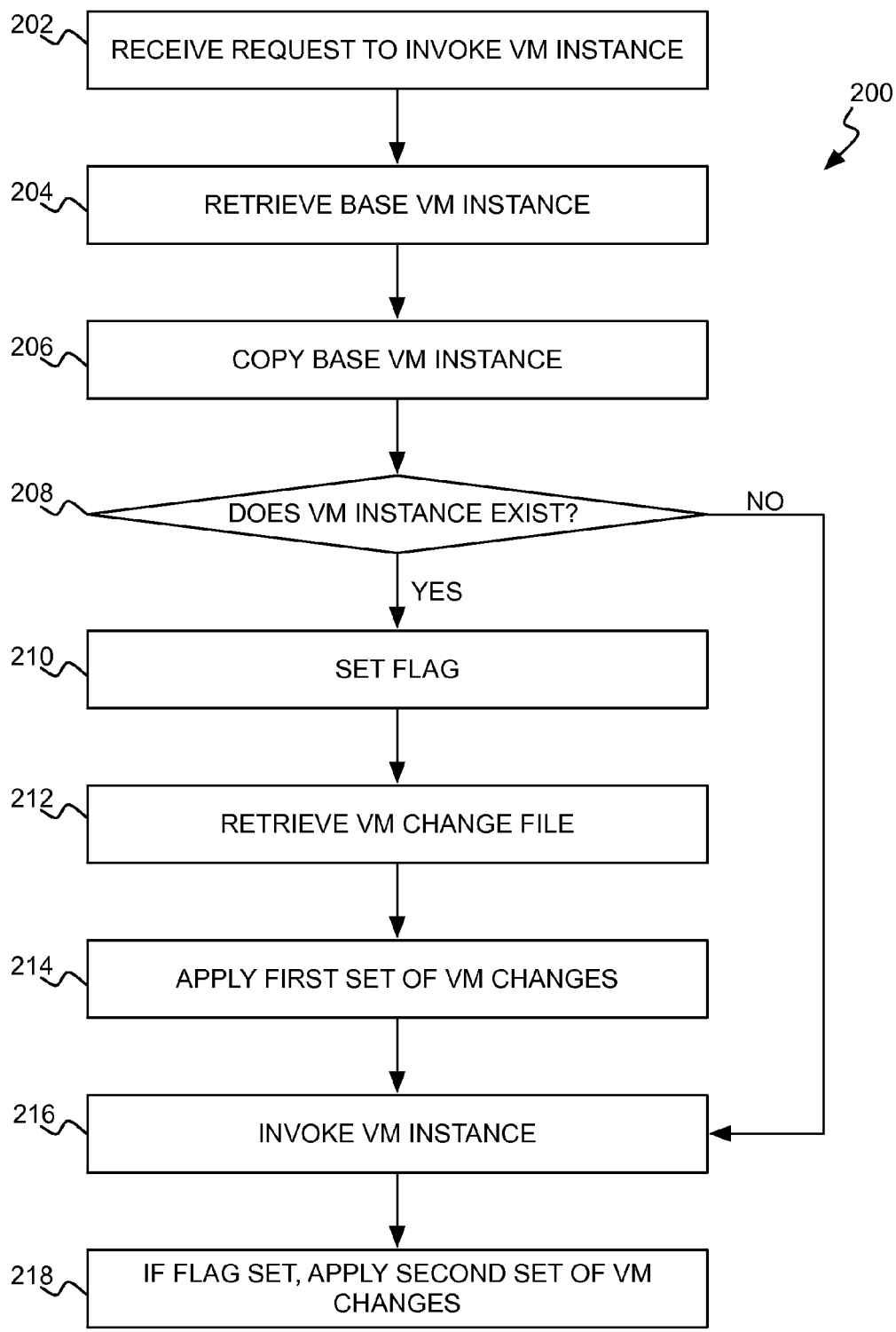
FIG. 2 is a flowchart of a method for dynamically generating a VM instance at time of invocation, according to an embodiment of the disclosure.

FIG. 2 shows a method 200 for invoking a VM instance 116, according to an embodiment of the disclosure. The method 200 is exemplarily described in relation to the VM instance 116A. A request is receive to invoke the VM instance 116A (202), such as from a user via a client device 104. In response, the base VM instance 112 is retrieved (204), and copied (206).

Particularly, the base VM instance 112 is a reference version, insofar as it pertains and corresponds to all the VM instances 116, and may not by itself ever be invoked as stored on the storage device 110. This reference version of the base VM instance 112 is copied to what is referred to as a temporary version of the base VM instance 112, which is subsequently transformed into a working version of the VM instance 116A that persists on the storage device 110 just so long as the VM instance 116A remains invoked. The VM instance 116A' of FIG. 1 is thus this working version of the VM instance 116A.

If the VM instance 116A has been previously invoked, then it is said to exist insofar as the VM change file 114A will have been previously generated. In this respect, if the VM instance 116A exists (208), then a flag corresponding to this fact is set (210). The VM change file 114A corresponding to the VM instance 116A is then retrieved (212).

The VM change file 114A can include two sets of VM changes to be applied to the base VM instance 112 to dynamically generate the VM instance 116A. The first set of VM changes are to be applied to the base VM instance 112 (i.e., to the temporary version thereof) before invocation of the VM instance 116A. By comparison, the second set of VM changes are applied to the VM instance 116A (i.e., to the working version thereof) after invocation of the VM instance 116A, such as, for instance, to configure the invoked VM instance 116A as appropriate.

For example, the first set of VM changes may be changes to the underlying operating system of the base VM instance 112 that have to be made before the dynamically generated VM instance 116A is invoked. These changes may be those that are necessary during booting of the operating system, and thus have to be applied before the operating system is started. By comparison, the second set of VM changes may be changes that cannot be made to the operating system of the dynamically generated VM instance 116A until the operating system has started, and thus have to be applied after the operating system has started.

Therefore, the first set of VM changes of the VM change file 114A, if any, is applied to the base VM instance 112 to dynamically generate the VM instance 116A (214). More specifically, the first set of VM changes is applied to the temporary version of the base VM instance 112 to dynamically generate the working version of the VM instance 116A (i.e., to transform the temporary version of the base VM instance 112 into the working version of the VM instance 116A). After application of this first set of VM changes, the VM instance 116A has been sufficiently created to permit invocation.

As such, the VM instance 116A is invoked (216). More specifically, the dynamically generated working version of the VM instance 116A is invoked, which is the VM instance 116A' identified in FIG. 1. It is noted that part 216 is proceeded to from part 208 if no VM instance 116A previously existed, such that the VM instance 116A that is invoked is the base VM instance 112 itself. More specifically, in this case, the VM instance 116A that is invoked is the temporary version of the base VM instance 112 that was previously copied, and which has become the working version of the VM instance 116A insofar as no VM change file 114A exists such that no VM changes have to be applied to the base VM instance 112 to dynamically generate the VM instance 116A.

Invocation of the VM instance 116A means that the VM instance 116A is started. This causes the operating system of the VM instance 116A to boot. Once the operating system has booted up, the user can then use the operating system. If the flag was previously set, then the second set of VM changes, if any, are applied to the VM instance 116A (i.e., to the working version thereof) (218), such as to configure the VM instance 116A.

It is noted that with respect to the method 200, until and unless the given VM instance 116A is invoked, a complete version of the VM instance 116A is not individually stored, such as on the storage device 110. Now, it can be said that the VM instance 116A is stored insofar as the VM change file 114A in combination with the base VM instance 112 represent the VM instance 116A. However, this combination does not individually represent the VM instance 116A because the base VM instance 112 is shared by all the VM instances 116.

Rather, a complete version of the VM instance 116A individually persists just when a reference version of the base VM instance 112 has been copied to a temporary version thereof and transformed into a working (i.e., complete) version of the VM instance 116A upon application of the VM change file 114A to the temporary version of the base VM instance 112. A complete version of the VM instance 116 also individually persists where no such VM change file 114A exists when a reference version of the base VM instance 116A has been copied to a temporary version thereof, which de facto becomes the working version of the VM instance 116A. Ultimately, then, if the VM instance 116 is not running, it does not individually persist on the storage device 110.

Figure 3:
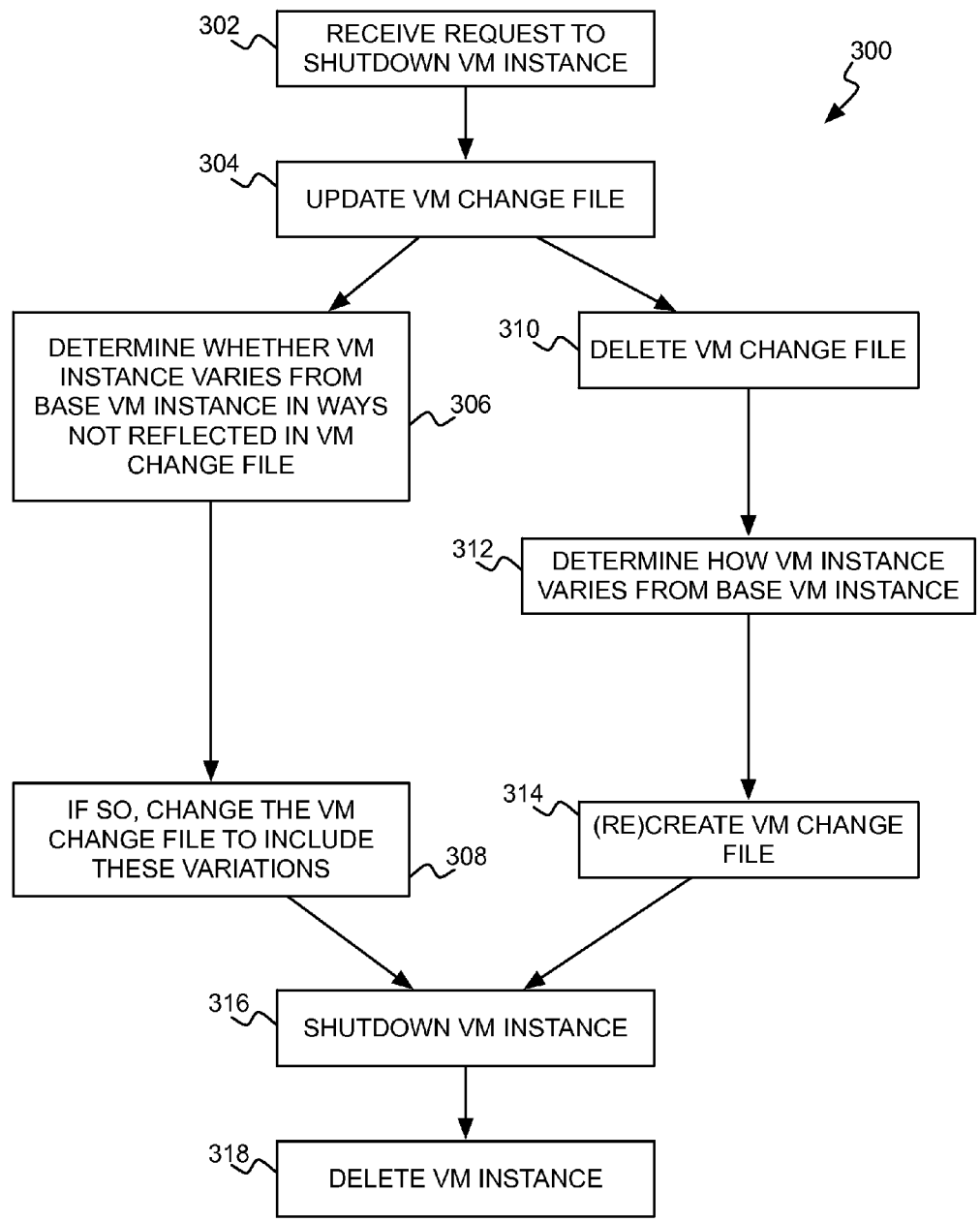
FIG. 3 is a flowchart of a method for shutting down and deleting a VM instance that has been previously dynamically generated, according to an embodiment of the disclosure.

FIG. 3 shows a method 300 for shutting down a VM instance 116 that has previously been invoked and is running, according to an embodiment of the disclosure. The method 300 is exemplarily described in relation to the VM instance 116A. A request is received to shutdown the VM instance 116A (302), such as from a user via a client device 104. It is noted that the VM instance 116A' is that which is actually running. That is, the dynamically generated working version of the VM instance 116A, created by applying the VM change file 114A to a temporary version of the reference version of the base VM instance 112, is that which is actually running.

In response, the VM change file 114A is updated (304). The VM change file 114A is updated in accordance with one of two different approaches, by performing parts 306 and 308, or by performing parts 310, 312, and 314. In the former approach, it is determined whether the VM instance 116, as running, varies from the base VM instance 112 in ways not reflected in the VM change file 114A (306). That is, the dynamically generated working version of the VM instance 116A may have been further modified after it has been invoked, in ways that are thus not reflected in the VM change file 114. If there are one or more such variations from the base VM instance 112, then the VM change file is changed (i.e., updated) to include these additional variations (308).

In the latter approach, the VM change file 114A is first deleted (310), and then it is determined how the VM instance 116, as running, varies from the base VM instance 112 (312). That is, the variations of the dynamically generated working version of the VM instance 116A from the base VM instance 112, if any, are determined. The VM change file 114A is then (re)created to reflect these variations (314). That is, the VM change file 114 is (re)created to indicate how the working version of the VM instance 116A that is running varies from the base VM instance 112.

Parts 306 and 308 thus represent an approach to update the VM change file 114A where just incremental changes are made to the VM change file 114A. By comparison, parts 310, 312, and 314 represent an approach to update the VM change file 114A by recreating the VM change file 114A from scratch, as opposed to just incrementally changing the VM change file 114A. It is noted that these two approaches effectively collapse to a single approach where no VM change file 114A previously existed. That is, where no VM change file 114A already exists, then the VM change file 114A is created to reflect how the working version of the VM instance 116A varies from the base VM instance 112.

Once the VM change file 114A has been updated, the working version of the VM instance 116A is shutdown (316), and deleted (318). That is, what is identified as the VM instance 116A' in FIG. 1 is shutdown and deleted. This is the temporary version of the base VM instance 112 (which itself was created by copying the reference version of the base VM instance 112A) that has been transformed into the VM instance 116A (i.e., into the working version thereof).

The VM instance 116A thus does not individually and completely persist on the storage device 110 once it has been shutdown, but rather it is deleted, insofar as the VM instance 116A' is deleted. The VM instance 116A remains on the storage device 110 just insofar as the VM change file 114A in combination with the base VM instance 112 completely represents the VM instance 116A. However, it is not said that the VM instance 116A individually persists on the storage device 110 in this manner, because the base VM instance 112 represents all the VM instances 116, and does not individually represent just the VM instance 116A.

Figure 4:
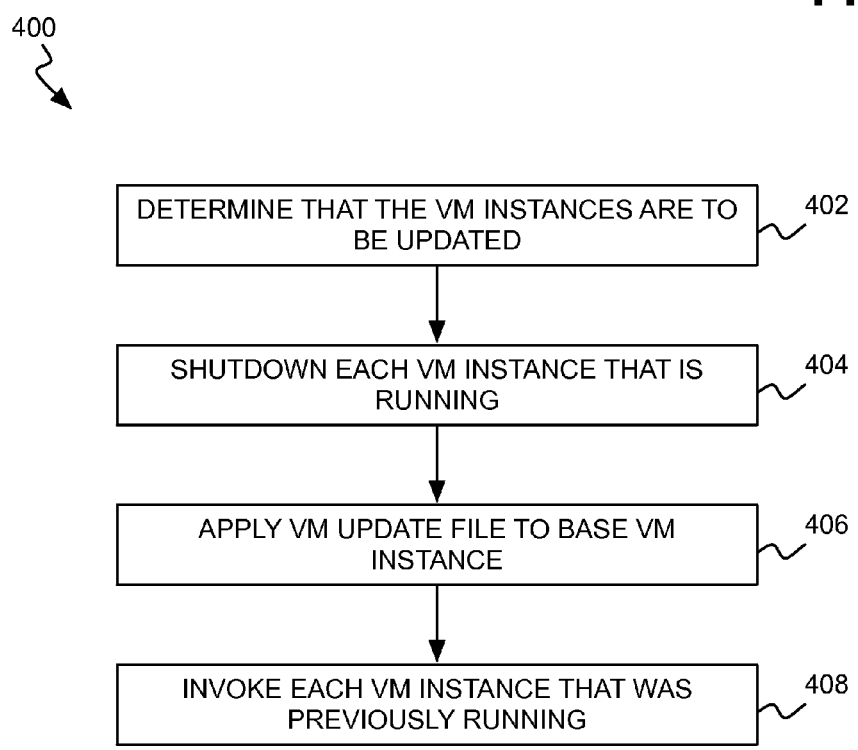
FIG. 4 is a flowchart of a method for updating a number of VM instances en masse by updating their base VM instance, according to an embodiment of the disclosure.

FIG. 4 shows a method 400 for updating all the VM instances 116, according to an embodiment of the disclosure. It is determined that the VM instances 116 are to be updated (402). For instance, an administrator may after having tested a recently released service pack to the operating system underlying the VM instances 116 determine that the service pack is now to be applied to the VM instances 116.

In response, each VM instance 116 that is currently running may be shutdown (404). This can be achieved by performing the method 300 for each such running VM instance 116. More specifically, the working version of each VM instance 116 is shutdown and deleted.

A VM update file is applied to the base VM instance 112 to update the base VM instance 112 (406). More specifically, the VM update file is applied to the reference version of the base VM instance 112 that may not in actuality be ever invoked, but rather serves, upon being copied to a temporary version thereof, as the basis upon which a VM change file 114 is applied to dynamically generate a working version of a corresponding VM instance 116. The VM update file includes the changes that result in updating of the base VM instance 112. For instance, in the case of a service pack, the service pack may be executed against the operating system of the base VM instance 112.

Each VM instance 116 that was previously running and that was shutdown in part 404 may be (re)invoked (408). This can be achieved by performing the method 200 for each such VM instance 116. The method 400 may be performed when few if any VM instances 116 are running, such as late at night, to avoid unnecessarily interrupting users who are actively working in their VM instances 116.

The method 400 provides for updating all the VM instances 116 that correspond to the base VM instance 112, without having to individually update each VM instance 116. Rather, just the base VM instance 112 is updated. From a maintenance and administration standpoint, this greatly speeds the update process. Applying a service pack, for instance, can take quite some time. If there are 10,000 VM instances 116 that correspond to the base VM instance 112, for example, then this means that just one VM instance—the reference version of the base VM instance 112 in particular—has to be updated, instead of 10,000 individual VM instances.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method, executed by a processor, comprising, in response to a request to invoke a given virtual machine (VM) instance for a given user:
    retrieving a base VM instance corresponding to a plurality of VM instances for a plurality of users, including the given VM instance for the given user;
    retrieving a VM change file particular to just the given VM instance, the VM change file indicating how the given VM instance varies from the base VM instance for the given user, the VM change file corresponding to the given user and being one of a plurality of given VM change files, each given VM change file corresponding to a different user;
    applying the VM change file to the base VM instance to dynamically generate the given VM instance;
    invoking the given VM instance as has been dynamically generated,
    wherein the given VM instance is not dynamically generated until the request to invoke the given VM instance has been received from the given user,
    determining that the plurality of VM instances are all to be updated; and in response to determining that the plurality of VM instances are all to be updated, applying a VM update file to the base VM instance to update the base VM instance, such that the VM instances are updated without having to update each VM instance individually.

2. The method of claim 1, wherein the VM change file comprises a first set of VM changes to be applied to the base VM instance to dynamically generate the given VM instance, and a second set of VM changes to be applied to the given VM instance after dynamic generation thereof to configure the given VM instance after the given VM instance has been invoked,
   wherein applying the VM change file to the base VM instance to dynamically generate the given VM instance comprises applying the first set of VM changes to the base VM instance to dynamically generate the given VM instance,
   and wherein the method further comprises, after invoking the given VM instance as has been dynamically generated, applying the second set of VM changes to the given VM instance as has been dynamically generated and invoked to configure the given VM instance.

3. The method of claim 1, wherein retrieving the base VM instance comprises copying a reference version of the base VM instance to yield a temporary version of the base VM instance, and
   wherein applying the VM change file to the base VM instance comprises applying the VM change file to the temporary version of the base VM instance to transform the temporary version of the base VM instance into the given VM instance.

4. The method of claim 1, wherein until and unless the given VM instance is invoked, a complete version of the given VM instance is not individually stored.

5. The method of claim 1, further comprising, after invoking the given VM instance as has been dynamically generated, and in response to a request to shutdown the given VM instance:
   updating the VM change file to reflect how the given VM instance varies from the base VM instance for the given user;
   shutting down the given VM instance; and,
   deleting the given VM instance.

6. The method of claim 5, wherein retrieving the base VM instance comprises copying a reference version of the base VM instance to yield a temporary version of the base VM instance,
   wherein applying the VM change file to the base VM instance comprises applying the VM change file to the temporary version of the base VM instance to transform the temporary version of the base VM instance into the given VM instance,
   and wherein deleting the given VM instance comprises deleting the temporary version of the base VM instance that has been transformed into the given VM instance.

7. The method of claim 5, wherein updating the VM change file comprises:
   determining whether the given VM instance includes any variations from the base VM instance for the given user that are not reflected within the VM change file; and,
   where the given VM instance includes one or more variations from the base VM instance that are not reflected within the VM change file, changing the VM change file to include the variations that are not reflected within the VM change file.

8. The method of claim 5, wherein updating the VM change file comprises:
   deleting the VM change file;
   determining how the given VM instance varies from the base VM instance for the given user;
   recreating the VM change file to indicate how the given VM instance varies from the base VM instance for the given user.

9. The method of claim 1, further comprising, in response to determining that the plurality of VM instances are all to be updated:
   shutting down the given VM instance;
   after the VM update file has been applied to the base VM instance, applying the VM change file to the base VM instance to again dynamically generate the given VM instance, and again invoking the given VM instance as has been dynamically generated.

10. A system comprising:
   a memory device to store a base virtual machine (VM) instance corresponding to a plurality of VM instances, and to store a plurality of VM change files corresponding to the VM instances, each VM change file indicating how just the VM instance to which the VM change file corresponds varies from the base VM instance, each VM change file corresponding to a different user; and,
   a VM manager to, responsive to a request to invoke a selected VM instance of the VM instances, apply the VM change file corresponding to the selected VM instance to the base VM instance to dynamically generate the selected VM instance and invoke the selected VM instance that has been dynamically generated,
   wherein the selected VM instance is not dynamically generated until the request to invoke the selected VM instance has been received from the different user to which the VM change file corresponding to the selected VM instance corresponds, and
   wherein the VM manager is further to, responsive to a determination that the plurality of VM instances are all to be updated, apply a VM update file to the base VM instance to update the base VM instance, such that the VM instances are updated without having to update each VM instance individually.

11. The system of claim 10, wherein the VM manager is to, responsive to the request to invoke the selected VM instance, copy the base VM instance to yield a temporary version of the base VM instance,
   wherein the VM manager is to apply the VM change file corresponding to the selected VM instance to the base VM instance by applying the VM change file corresponding to the selected VM instance to the temporary version of the base VM instance to transform the temporary version of the base VM instance into the selected VM instance,
   such that until and unless the selected VM instance is invoked, a complete version of the selected VM instance is not individually stored on the storage device.

12. The system of claim 10, wherein the VM manager is to, responsive to a request to shutdown the selected VM instance, update the VM change file corresponding to the selected VM instance to reflect how the selected VM instance varies from the base VM instance, shut down the selected VM instance, and delete the selected VM instance.

13. A computer program product comprising:
   a memory device storing computer-readable code, the computer-readable code executed by a processor to, responsive to a request to shutdown a particular virtual machine (VM) instance that has been invoked and is running:

generate a VM change file corresponding to just the particular VM instance to reflect how the particular VM instance varies from a base VM instance corresponding to a plurality of VM instances including the particular VM instance;

shut down the particular VM instance; and, delete the particular VM instance, wherein the VM change file is one of a plurality of given VM change files, each given VM change file corresponding to a different user, wherein the computer-readable code is further executable by the processor to, responsive to a request to invoke the particular VM instance:

apply the VM change file corresponding to just the particular VM instance to the base VM instance to dynamically generate the particular VM instance; and, invoke the particular VM instance that has been dynamically generated, and wherein the particular VM instance is not dynamically generated until the request to invoke the particular VM instance has been received from the different user to which the particular VM change file corresponding to just the particular VM instance corresponds, wherein the computer-readable code is further executed by the processor to, responsive to a determination that the plurality of VM instances are all to be updated, apply a VM update file to the base VM instance to update the base VM instance, such that the VM instances are updated without having to update each VM instance individually.

14. The computer program product of claim 13, wherein the computer-readable code is further executable by the processor to, responsive to the request to invoke the particular VM instance, copy the base VM instance to yield a temporary version of the base VM instance, wherein the computer-readable code is executable by the processor to apply the VM change file to the base VM instance by applying the VM change file to the temporary version of the base VM instance to transform the temporary version of the base VM instance into the particular VM instance, such that until and unless the particular VM instance is invoked, a complete version of the particular VM instance is not individually stored.

* * * * *